United States Patent
Nelson

(10) Patent No.: US 9,416,545 B1
(45) Date of Patent: Aug. 16, 2016

(54) POST MOUNT WITH QUICK RELEASE LOCKING MECHANISM

(71) Applicant: LIPPERT COMPONENTS, INC., Elkhart, IN (US)

(72) Inventor: Jon Nelson, Elkhart, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 15/051,248

(22) Filed: Feb. 23, 2016

Related U.S. Application Data

(60) Provisional application No. 62/120,102, filed on Feb. 24, 2015.

(51) Int. Cl.
*E04F 11/18* (2006.01)
*E04H 12/22* (2006.01)

(52) U.S. Cl.
CPC ........ *E04F 11/1812* (2013.01); *E04H 12/2261* (2013.01)

(58) Field of Classification Search
CPC ......... E04H 17/14; E04H 17/20; E04H 17/22; E04H 12/22; E04H 12/2253; E04H 12/2261; E04H 12/2269; E04H 12/2276; Y10T 403/46; Y10T 403/4694; E04F 11/1812
USPC ........................................... 256/65.14, 65.12
See application file for complete search history.

(56) References Cited

U.S. PATENT DOCUMENTS

| | | | | | |
|---|---|---|---|---|---|
| 4,334,671 | A | * | 6/1982 | De Guise | E04F 11/181 256/22 |
| 6,405,991 | B1 | * | 6/2002 | Damiano | E04H 12/2261 248/519 |
| 2005/0150388 | A1 | * | 7/2005 | Matus, Jr. | A47F 10/06 99/275 |
| 2012/0292360 | A1 | * | 11/2012 | O'Regan | B60R 5/04 224/567 |
| 2014/0054529 | A1 | * | 2/2014 | Whiteley | E04H 17/22 256/31 |
| 2015/0225919 | A1 | * | 8/2015 | Wagler | E02D 27/42 52/166 |

FOREIGN PATENT DOCUMENTS

| | | | | | |
|---|---|---|---|---|---|
| CA | 2366213 | A1 | * | 8/2002 | ......... E04H 12/2269 |
| CA | 2820057 | A1 | * | 1/2015 | ......... E04F 11/1812 |
| GB | 2518895 | A  | * | 4/2015 | ......... E01F 13/022 |
| WO | WO 9800614 | A2 | * | 1/1998 | ......... E04H 12/2238 |

* cited by examiner

*Primary Examiner* — Jonathan Masinick
(74) *Attorney, Agent, or Firm* — Barnes & Thornburg LLP

(57) ABSTRACT

A post mount includes a base configured for attachment to a ramp door of a vehicle and a paddle pivotally connected to the base. The base and paddle cooperate to receive a shaft and flange of a post. The paddle may be pivoted and flexed with respect to the base to allow release of the post from the post mount.

20 Claims, 9 Drawing Sheets

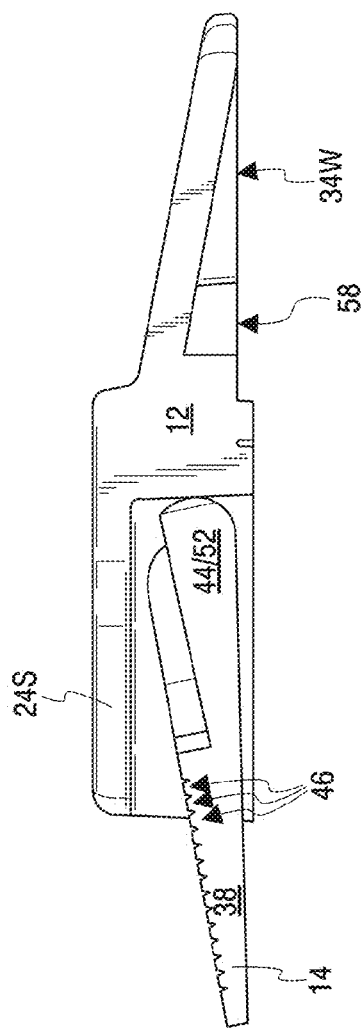
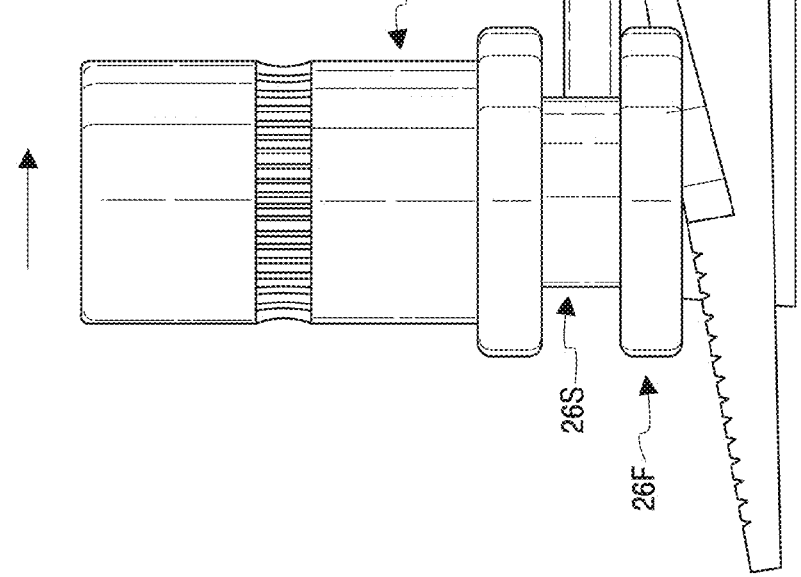
Fig. 9
Fig. 10

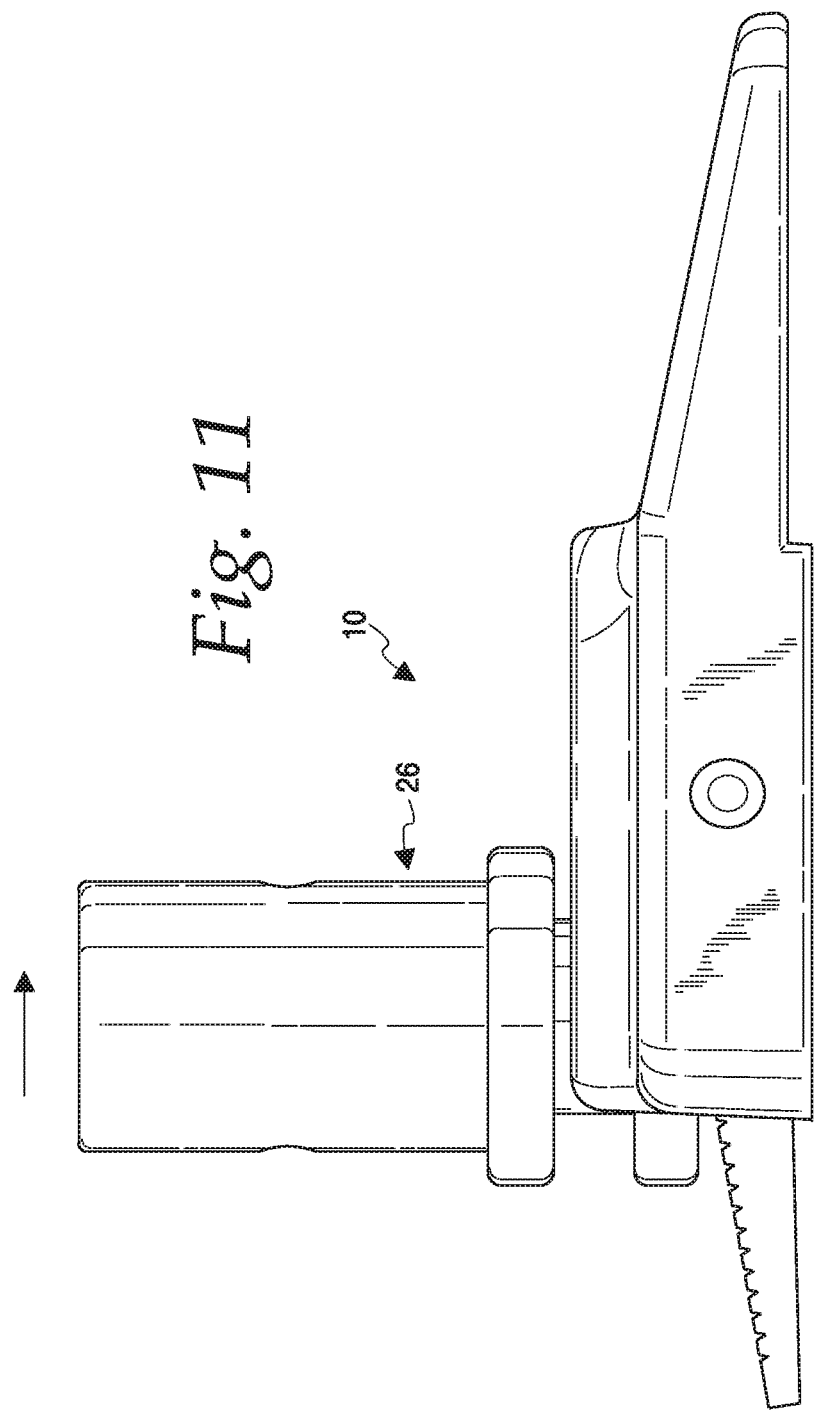

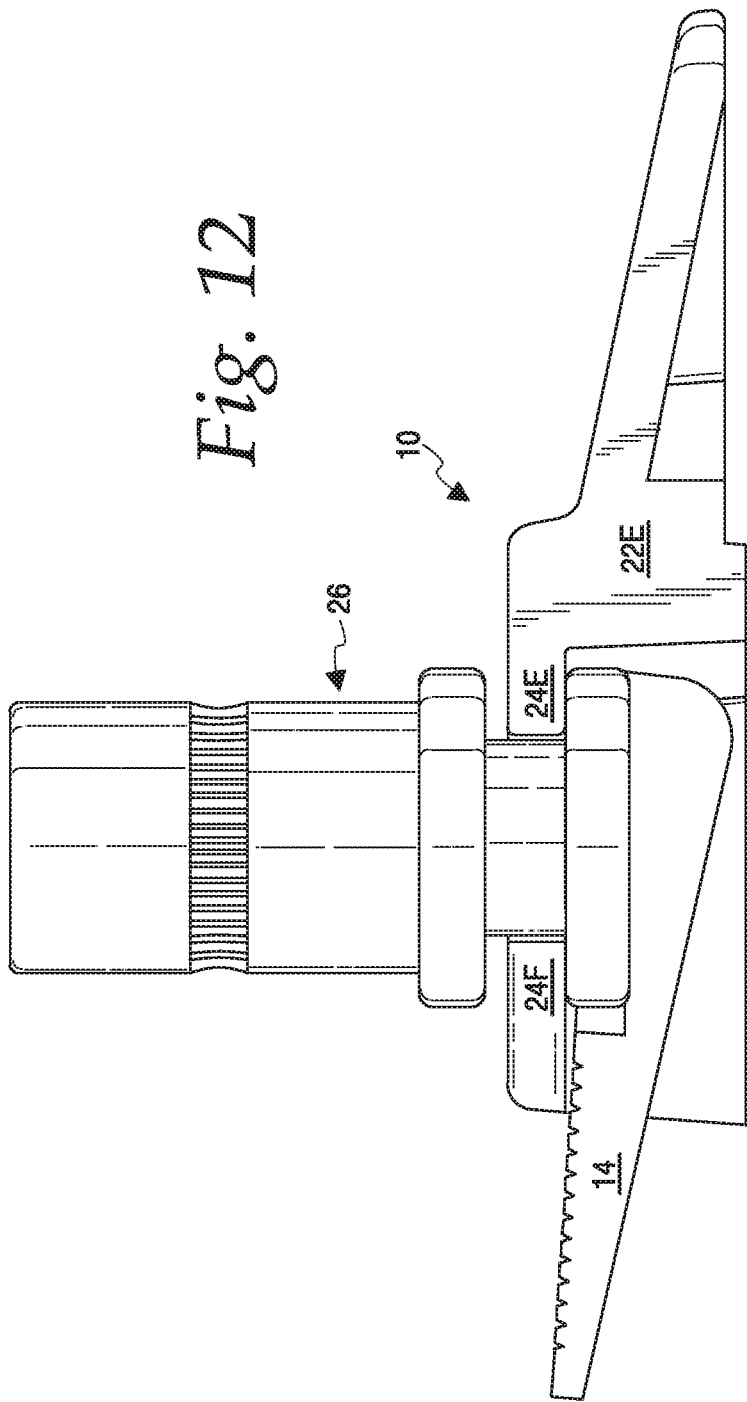

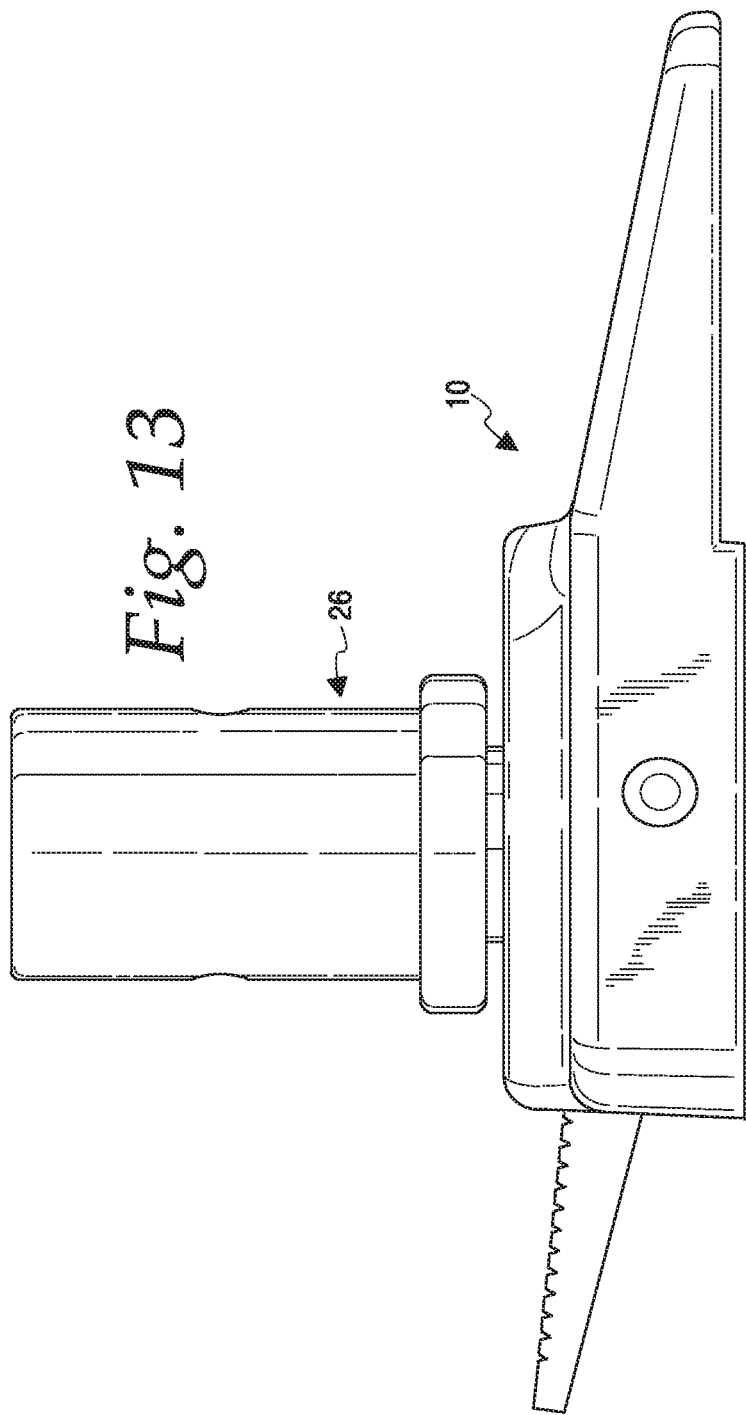

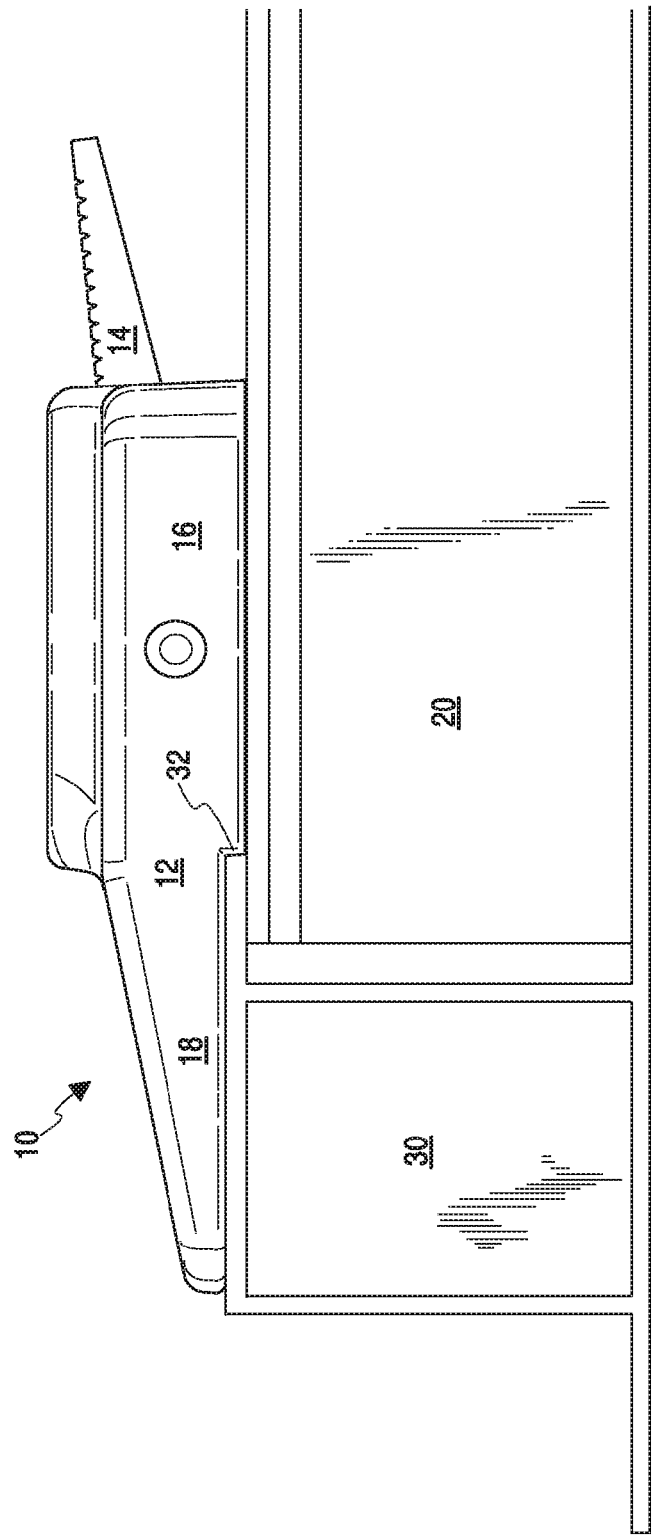

POST MOUNT WITH QUICK RELEASE LOCKING MECHANISM

CROSS-REFERENCE TO RELATED APPLICATION

This application claims benefit under 35 U.S.C. §119 of U.S. Provisional Patent Application No. 62/120,102, filed on Feb. 24, 2015, and incorporates by reference the disclosure thereof in its entirety.

BACKGROUND AND SUMMARY OF THE DISCLOSURE

Some recreational vehicles, for example, toy haulers, include a rear door that unfolds about a bottom hinge. The top of the door may thus be lowered to ground level to form a ramp between the floor of the vehicle and the ground, thereby facilitating loading and unloading of goods from the interior of the RV. A torsion spring may be provided in combination or otherwise in connection with the bottom hinge to allow a user to raise and lower the door without bearing its full weight.

Some such ramp doors are configurable as patios or party decks, as well as ramps. Such doors typically include cables configured to suspend the door in a generally horizontally position (with the RV in a generally level orientation). The doors also may include removable railing to preclude persons occupying the deck from inadvertently stepping or falling off of it.

The present disclosure is directed to a mount for selectively receiving and locking into place a post for such a railing. The mount could be used in other applications, as well.

BRIEF DESCRIPTION OF THE DRAWINGS

FIG. 9 is a cross-sectional side elevation view of the post mount of FIG. 1 with the pedal in a "down" or "unlocked" or "release" position;

FIG. 10 is a cross-sectional side elevation view of a post partially engaged with the post mount of FIG. 1;

FIG. 11 is side elevation view of a post partially engaged with the post mount of FIG. 1;

FIG. 12 is a cross-sectional side elevation view of a post fully engaged with and locked into the post mount of FIG. 1;

FIG. 13 is a side elevation view of a post fully engaged with and locked into the post mount of FIG. 1; and FIG. 14 is a side elevation view of the post mount of FIG. 1 attached to a ramp door of an RV.

DETAILED DESCRIPTION OF THE DRAWINGS

Figure 1:
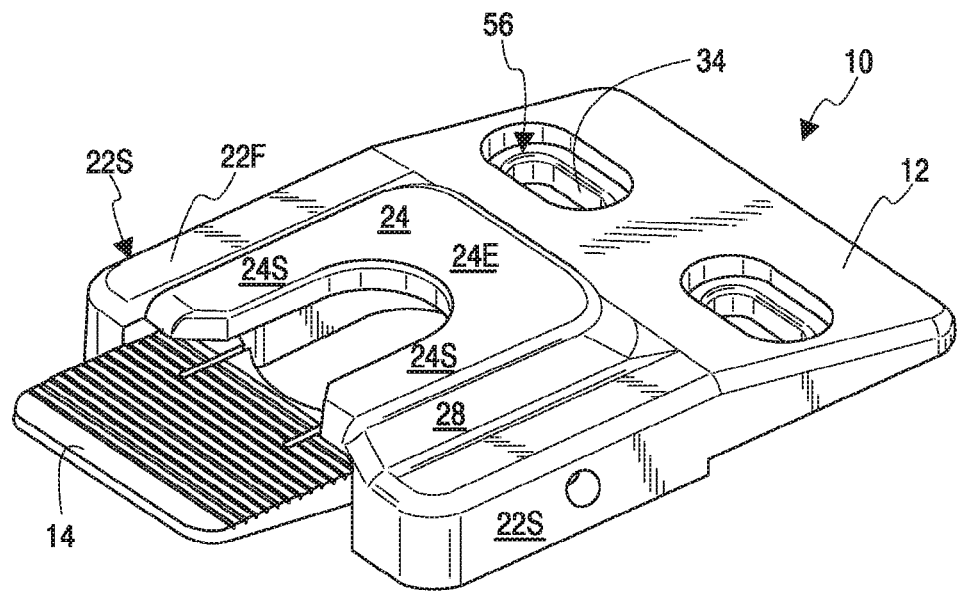
FIG. 1 is a perspective view of an illustrative post mount including a base and a pedal.
Figure 2:
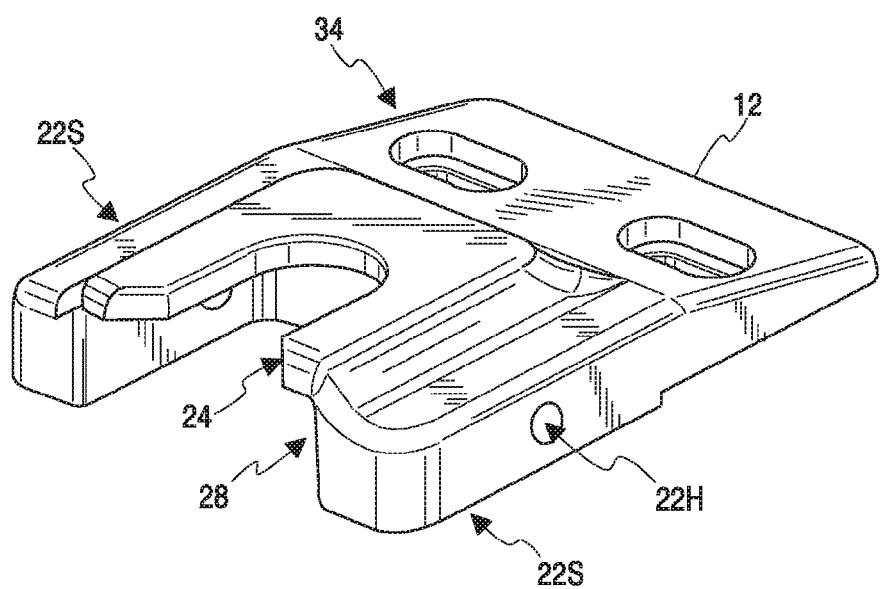
FIG. 2 is a perspective view of the base of FIG. 1.

The drawings show an illustrative embodiment of a post mount 10 including a base 12 and a pedal 14. The pedal 14 is pivotally connected to the base 12.

The base 12 includes a post-receiving portion 16 and an attachment portion 18 connected to and extending from the post-receiving portion. The post-receiving portion 16 is configured to selectively receive a post, for example, a post 26, as best shown in FIGS. 10-13 and as discussed further below. The post 26 may have a shaft 26S and a flange 26F at or near an end of the shaft. The attachment portion 18 is configured to facilitate mounting of the base 12 to a ramp door 20, door frame 30, or another substrate. The base 12 may be, but need not be, formed monolithically, for example, by molding, casting, machining, or another process.

The post-receiving portion 16 includes a generally u-shaped flange-receiving portion 22 configured to receive laterally the post flange 26F and a generally u-shaped shaft-receiving portion 24 configured to receive laterally the post shaft 26S. The flange-receiving portion 22 includes a pair of generally parallel side walls 22S connected at respective first ends thereof by an end wall 22E. The end wall 22E and side walls 22S are shown as having generally square or rectangular cross-sections, but could be configured in other ways. The end wall 22E is generally perpendicular to the side walls 22S. The end wall 22E and side walls 22S cooperate to define a slot configured to selectively receive the flange of the post 26. Each side wall 22S defines a hole 22H extending outwardly from a surface of the respective side wall 22S facing the other side wall 22S. Each hole 22H is configured to receive a pivot pin associated with the pedal 14, as will be discussed further below. The holes 22H may be through holes, as shown, or blind holes. A lower surface of the flange-receiving portion 22 is configured for abutment with a surface of the ramp door 20 or other substrate the post mount 10 may be attached to or an accessory thereto. Such lower surface may be generally planar.

The shaft-receiving portion 24 is shown as a u-shaped plate having a pair of opposed, generally parallel side walls 24S and an end wall 24E. The side walls 24S and end wall 24E cooperate to define a slot configured to selectively receive a shaft of the post 26. The end wall 24E is shown as having a radius complementary to a radius of a post 26 that may be disposed in this slot. The end wall 24E, however, need not be radiused. Instead, the end wall 24E could have other configurations. For example, the end wall 24E could be generally linear and perpendicular to the side walls 24S of the shaft-receiving portion 24.

The slot defined by the shaft-receiving portion 24 is narrower than the slot defined by the flange-receiving portion 22. The shaft-receiving portion 24 is connected to the flange-receiving portion 22 such that a flange of a post can be received between a lower portion of shaft-receiving portion and a surface of a substrate, for example, the surface of a ramp door 20 to which the post mount 10 may be attached. In the illustrated embodiment, this connection is made through a ramped interface section 28 disposed between an upper region of the flange-receiving portion 22 and the outer periphery of the shaft-receiving portion 24. In other embodiments, the interface section 28 could be perpendicular to both the flange-receiving portion 22 and the post-receiving portion 24.

The attachment portion 18 extends from the end wall 22E of the flange-receiving portion 22 of the post-receiving portion 16. The attachment portion 18 is shown as a generally square or rectangular wedge having a generally triangular side profile. In other embodiments, the attachment portion could take other forms, for example, a generally square or rectangular plate of generally uniform thickness. An upper surface of the attachment portion 18 extends obliquely downwardly from an upper portion of the end wall 22E of the flange-receiving portion 22 of the post-receiving portion 16. A lower surface of the attachment portion 18 is generally parallel to and upwardly offset from the lower surface of the post-receiving portion 16. As best shown in FIG. 14, this offset allows the lower surface of the attachment portion 18 to abut a surface of a frame 30 surrounding the door panel 20 when the lower surface of the post-receiving portion 16 abuts the surface of the door panel 20. A step 32 defined by the offset between the lower surface of the attachment portion 18 and the lower surface of the post-receiving portion 16 may abut an edge of the frame 30 and thereby serve as means for locating the post mount 10 in a desired position for attachment to the frame and/or the door panel 20. In other embodiments, the step 32 may be omitted and the lower surfaces of the post-receiving portion 16 and the attachment portion 18 may be generally flush with respect to each other. In further embodiments, the lower surfaces of the post-receiving portion 16 and the attachment portion 18 could be offset from other, for example, as shown in the drawings, or otherwise configured to correspond to non-planar or non-uniform surfaces to which they, respectively, may be attached or abut.

The attachment portion 18 defines a pair of apertures 34 therethrough in the form of elongated slots. In other embodiments, the apertures 34 could be round or have other shapes. The apertures 34 are shown as being countersunk from an upper surface of the attachment portion. In other embodiments, the countersinks could be omitted. Where provided, the counter sinks may be configured to provide a land 56 that is generally parallel to the lower surface of the attachment portion 18. A washer or head of a screw or other fastener may bear against the respective land 56 when the fastener is used to secure the base 12 to the ramp door or other substrate. In other embodiments, the base 12 could be attached to the ramp door or other substrate by other means, for example, adhesives, bonding, or welding.

Figure 8:
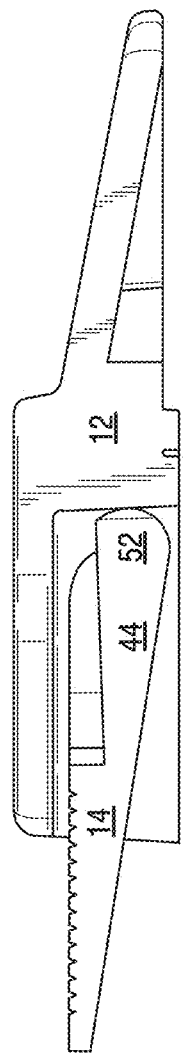
FIG. 8 is a cross-sectional side elevation view of the post mount of FIG. 1 with the pedal in an "up" or "locked" position.

As shown in, for example, FIGS. 8 and 9, the attachment portion 18 need not be a solid block of material. Instead, it may include one or more cavities 58 extending inwardly from the lower surface thereof. In such embodiments, walls 34W defining the apertures 34 may extend to or comprise the lowest portion of the lower surface, so that the walls defining the apertures may abut or otherwise engage the ramp door 20 or frame 30 or other substrate when the post mount 10 is attached thereto.

Figure 3:
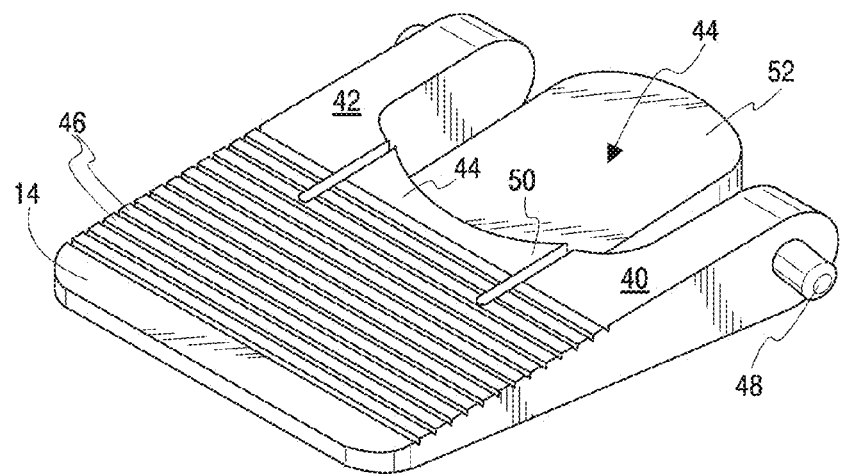
FIG. 3 is a perspective view of the pedal of FIG. 1.
Figure 5:
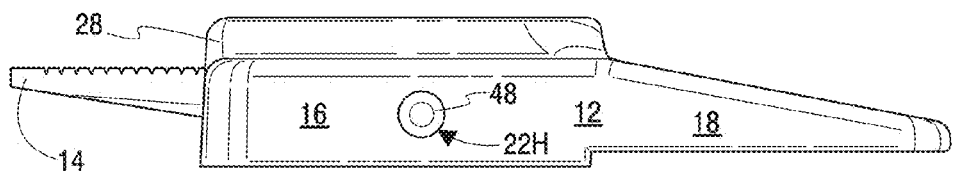
FIG. 5 is a side elevation view of the post mount of FIG. 1.
Figure 4:
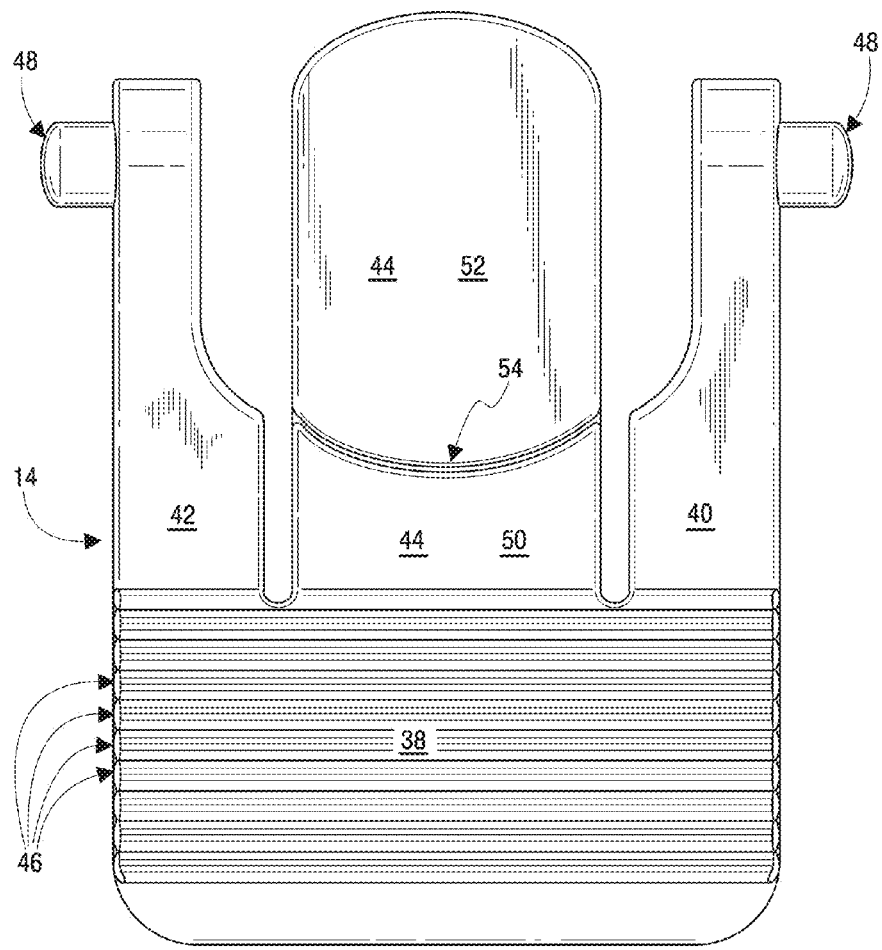
FIG. 4 is a top plan view of the pedal of FIG. 1.
Figure 6:
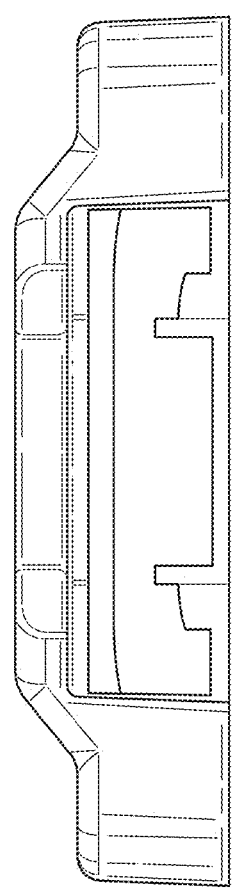
FIG. 6 is an end elevation view of the post mount of FIG. 1.
Figure 7:
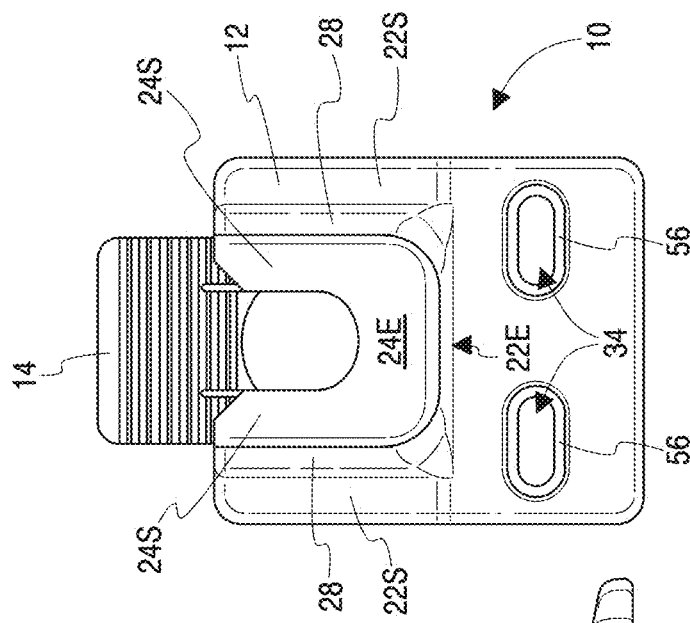
FIG. 7 is a top plan view of the post mount of FIG. 1.

As shown in, for example, FIGS. 3 and 4, the pedal 14 includes an actuator portion 38, a first pivot arm 40 extending rearwardly from one side of a rear edge of the actuator portion, a second pivot arm 42 extending rearwardly from another side of the rear edge of the actuator portion, and a paddle 44 extending rearwardly from the rear edge of the actuator portion, intermediate the first and second pivot arms. As shown, the pedal 14 may have a generally triangular cross-section to facilitate pivoting of the pedal about the base 12 and flexing of the pedal, as will become apparent from the discussion below.

The actuator portion 38 is sized for selective engagement by, for example, a user's hand or foot or another actuator or tool. An upper surface of the actuator portion 38 may include surface contour, for example, transversely-extending ribs 46, to enhance the engagement thereof by a user. The first and second pivot arms 40, 42 and/or paddle 44 or portions thereof may include similar or other surface contour.

Each pivot arm 40, 42 includes a pivot pin 48 extending laterally outwardly there from. Each pivot pin 48 is configured for pivotal engagement with the hole 22H in the respective side wall 22S of the flange-receiving portion 22 of the post-receiving portion 16.

The paddle 44 is shown as generally rectangular. A first portion 50 of the paddle 44 has an upper surface generally coextensive with an upper surface of the actuator portion 38. A second portion 52 of the paddle 44 has an upper surface generally parallel to and stepped down from the upper surface of the first portion 50 thereof. A curved step wall 54 defining the transition between the first and second portions 50, 52 of the paddle 44 has a radius complementary to the radius of a flange of the post 26 that may be selectively engaged thereby. The curved step wall 54 is generally coaxial with the curved end wall of the end wall 24E of the shaft-receiving portion 24. In other embodiments, the step wall 54 could have shapes other than curved. Generally, the step wall 54 of the paddle 44 and the end wall 24E of the shaft-receiving portion are configured with respect to each other to enable the post 26 to be selectively secured in the post mount 10, as discussed further below.

As suggested above, the post mount 10 is configured to selectively receive the post 26 or a similar structure. The post 26 includes a shaft 26S and a base or flange 26F extending radially outward from the shaft.

With the pedal 14 in a "down" position as shown, for example, in FIGS. 10 and 11, the post 26 may be slid in the direction of the arrow into the post-receiving portion 16. More specifically, the flange 26F of the post 26 may be slid from the opening of the slot defined by the flange-receiving portion 22 toward the end wall 22E thereof, and the shaft 26S of the post may be slid from the opening of the slot defined by the shaft-receiving portion 24 toward the end wall 24E thereof. In doing so, an upper surface of the flange 26F of the post 26 becomes captured between the lower surface of the shaft-receiving portion 24 and the upper surface of the paddle 44. The pedal 14 is sufficiently flexible that the paddle 44 may deflect downwardly (that is, pivot with respect to the first and second pivot arms 40, 42) as the post 26 continues to slide toward the closed ends of the foregoing slots.

Once the post 26 has been sufficiently inserted into the slots so that the trailing edge of the flange 26F has cleared the step wall 54, the pedal 14 may snap into or otherwise assume an "up" position, for example, as shown in FIGS. 12 and 13. The pedal 14 is sufficiently resilient to return to or toward its original shape once the post 26 has been so inserted into the post mount 10. With the pedal in the up position, the flange 26F is secured by the step wall 54, an upper surface of the stepped-down portion 52 of the pedal 14, and the lower surface of the shaft-receiving portion 24. Also, the shaft 26 is generally restrained by the slot defined by the shaft receiving portion 24.

With the post 26 installed in the mount as shown in FIGS. 12 and 13, the lowest portion of the pedal 14 may contact the door 20 or other substrate to which the post mount 10 may be attached and thereby transfer load applied to the post, through the pedal and to the door or other substrate.

The post 26 may be removed from the post mount 10 by pressing down on the actuator portion 38. The pedal 14 is sufficiently flexible that depressing the actuator portion 38 will cause the paddle 44 to flexibly deflect with respect to the first and second pivot arms 40, 42, thereby displacing the upper edge of the step wall 54 below the lower surface of the post flange 26F, so that the post 26 may be slid towards the open ends of the slots described above. The pedal 14 is sufficiently resilient that it may return to or toward its original shape once the post 26 has been removed from the post-mount 10.

Terms of orientation, for example, left, right, front, rear, up, down, and the like are used for reference to describe orientation of components relative to each other. Such terms should not be construed in the absolute sense unless context clearly dictates otherwise.

The invention claimed is:

1. A post mount comprising:
   a base attachable to a surface, the base having a post-receiving portion, the post-receiving portion having a flange-receiving portion defining a first slot and a shaft-receiving portion defining a second slot and having an underside, the second slot being narrower than the first slot; and
   a pedal pivotally attached to the base, the pedal having an actuator portion, a first pivot arm connected to and extending from the actuator portion, a second pivot arm connected to and extending from the actuator, and a paddle connected to the actuator portion, the paddle having a first surface and a wall adjacent a portion of the first surface, the paddle disposed between the first pivot arm and the second pivot arm;
   the pedal pivotable between a first position wherein an upper edge of the wall is a first distance from the underside of the shaft-receiving portion and a second position wherein the upper edge of the wall is a second distance from the underside of the shaft-receiving portion, the second distance greater than the first distance.

2. The post mount of claim 1, the flange-receiving portion comprising an end wall, a first side wall extending from the end wall, and a second side wall extending from the end wall, the end wall and the first and second side walls of the flange-receiving portion cooperating to define the first slot.

3. The post mount of claim 1, the shaft-receiving portion comprising an end wall, a first side wall extending from the end wall, and a second side wall extending from the end wall, the end wall and the first and second side walls of the shaft-receiving portion cooperating to define the second slot.

4. The post mount of claim 1, wherein the flange-receiving portion comprises first and second side walls each defining an aperture, and each of the first and second pivot arms comprising a pivot pin, the pivot pins of the first and second pivot arms pivotally engaged with the apertures of the first and second side walls, respectively.

5. The post mount of claim 4, the pedal defining a third slot between the first pivot arm and said paddle, and a fourth slot between the second pivot arm and the paddle.

6. The post mount of claim 5, the third slot extending into the actuator portion.

7. The post mount of claim 6, the fourth slot extending into the actuator portion.

8. The post mount of claim 4, the pivot pins of the first and second pivot arms proximate free ends of the first and second pivot arms, respectively.

9. The post mount of claim 4, a surface of the actuator portion comprising texture.

10. The post mount of claim 9, the texture comprising a plurality of grooves.

11. The post mount of claim 1 in combination with a post having a shaft and a flange, the flange slidably receivable in the first slot of the flange-receiving portion and the shaft slidably receivable in the second slot of the shaft-receiving portion.

12. The combination of claim 11, the flange slidable over the wall adjacent to the paddle when the pedal is in the second position.

13. The combination of claim 12 wherein the flange engages with the paddle and the wall adjacent to the paddle as the flange is being inserted into the second slot.

14. The combination of claim 13 wherein the paddle pivots with respect to the first pivot arm and the second pivot arm as the post is further inserted into the second slot.

15. The combination of claim 14 wherein the paddle resiliently returns towards its original position with respect to the first pivot arm and the second pivot arm when the post is fully received within the second slot.

16. The combination of claim 15 wherein the paddle flexibly pivots with respect to the first pivot arm and the second pivot arm in response to a force applied to the actuator portion perpendicular thereto.

17. The combination of claim 16 wherein the paddle resiliently returns towards its original position with respect to the first pivot arm and the second pivot arm when the post is removed from the second slot.

18. The post mount of claim 1, the base further comprising an attachment portion connected to the post-receiving portion.

19. The post mount of claim 18, the attachment portion defining at least one aperture configured for receiving a fastener.

20. The post mount of claim 18, the attachment portion and the post-receiving portion each having a lower surface, the lower surface of the attachment portion not co-planar with the lower surface of the post-receiving portion.

\* \* \* \* \*